(12) United States Patent
Sharp et al.

(10) Patent No.: US 6,330,503 B1
(45) Date of Patent: Dec. 11, 2001

(54) GLOBAL POSITIONING SYSTEM CONTROLLED STAKING APPARATUS

(75) Inventors: Kevin Andrew Ian Sharp, Christchurch; Charles David Hope Manning, Coalgate, both of (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/678,506

(22) Filed: Oct. 2, 2000

Related U.S. Application Data

(63) Continuation-in-part of application No. 09/516,995, filed on Mar. 1, 2000, now Pat. No. 6,299,934, which is a continuation of application No. 09/255,424, filed on Feb. 22, 1999, now Pat. No. 6,074,693.

(51) Int. Cl.[7] .............................. G06F 17/00; G06G 7/70
(52) U.S. Cl. ........................ 701/50; 404/84.05; 404/93; 173/1; 173/90; 701/213; 701/214; 702/5; 342/357.08; 342/357.13
(58) Field of Search .................................. 427/136, 137; 700/253, 302; 701/213, 214, 50; 702/5; 342/357.06, 357.08, 357.13, 357.17; 404/75, 84.05, 93, 94; 173/1, 90, 91

(56) References Cited

U.S. PATENT DOCUMENTS

| | | |
|---|---|---|
| 5,512,905 * | 4/1996 | Nichols et al. .................. 342/357 |
| 5,540,516 * | 7/1996 | Nicodemo et al. .................. 404/12 |
| 5,739,785 | 4/1998 | Allison et al. .................. 342/357 |
| 5,745,074 * | 4/1998 | Laude .................. 342/357 |
| 5,838,277 | 11/1998 | Loomis et al. .................. 342/357 |
| 5,862,501 | 1/1999 | Talbot et al. .................. 701/50 |
| 6,053,260 * | 4/2000 | Boon et al. .................. 173/90 |
| 6,104,339 | 8/2000 | Nichols .................. 342/357 |

* cited by examiner

Primary Examiner—Shrive P. Beck
Assistant Examiner—Jennifer Calcagni
(74) Attorney, Agent, or Firm—David R. Gildea

(57) ABSTRACT

A global positioning system (GPS) controlled marking apparatus for staking and a method of using the apparatus to stake a surface. The apparatus uses a standard architectural or other surface site application program and a stakeout driver program in a standard computer and includes a GPS receiver, a stakeout tool, an autopilot, a vehicle, a geographical drawing converter, and a location comparator. The geographical drawing converter converts an image of a drawing pattern to geographical mark locations. The autopilot guides the vehicle to the geographical mark locations. The location comparator detects a location march between the geographical mark locations of the drawing pattern and a current geographical location determined by the GPS receiver. Information for the location match is used by the stakeout tool for driving a stake into the ground.

5 Claims, 6 Drawing Sheets

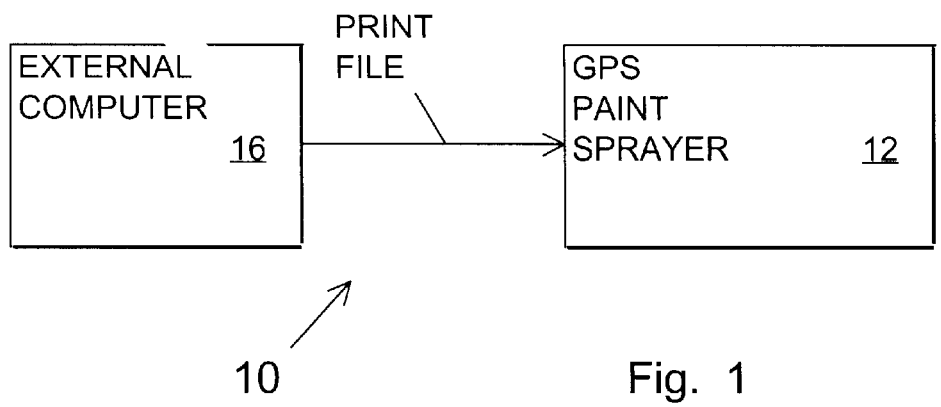
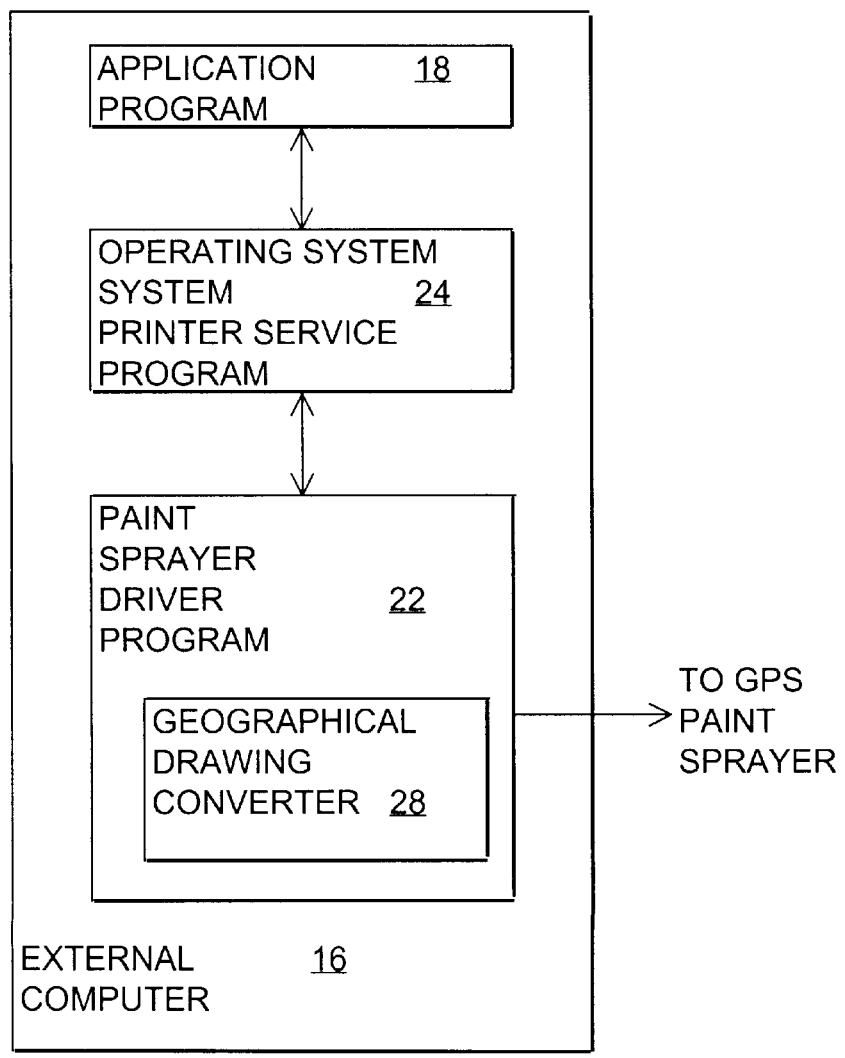

GLOBAL POSITIONING SYSTEM CONTROLLED STAKING APPARATUS

This is a continuation in part of application Ser. No. 09/516,995, filed on Mar. 1, 2000, now U.S. Pat. No. 6,299,934, which is a continuation of application Ser. No. 09/255,424, filed on Feb. 22, 1999, now U.S. Pat. No. 6,074,693.

BACKGROUND OF THE INVENTION

1. Field of the Invention

The invention relates generally to site marking machinery and more particularly to global positioning system (GPS) controlled apparatus and methods using standard commercial page making software for marking a site surface according to GPS-based geographical locations.

2. Description of the Prior Art

Road markings are produced to a great extent with the assistance of so called "road marking" machines which apply paint under pressure from spray nozzle jets onto the road surface. In marking the road it is quite important that the horizontal registration of the paint be accurate with respect to the position of the road. In the past even experienced machine operators have found it difficult to manually guide a road marking machine with sufficient accuracy even where old markings are available. Heretofore, attempts have been made to automatically detect the presence of old markings and to use their detection for automatically guiding the road marking machine and switching the spray nozzle on and off as required. However, such attempts have not been wholly satisfactory because a break in the old marking does not give steering guidance during breaks. Moreover, this approach is of no use whatsoever where the old marks have disappeared or for new markings. Various arrangements have been disclosed for solving these problems by automatically guiding the road marking machine along a pre-determined path using light or electromagnetic beams. However, these arrangements require transmitters to be placed along the road, and in the case of light beams, are degraded by the effect of sunlight. In order to overcome these problems, it has been proposed to embed material that emitting radiation in the path that is to be marked. However, this method suffers from the disadvantage that embedding the radiating material in the road surface can be costly. Furthermore, radiating materials tend to lose their effectiveness after a time period. Similar issues pertain to parking lots, air landing fields, and the like.

For athletic games between teams of individuals it is customary to provide certain markings with chalk, lime, or paint of the various portions of the field on which the game is played. It is common for teams to add drawings for their logos or for advertisers to add picture-like patterns to the fields. Athletics such as American football, soccer, rugby, and baseball, are held on the same field at different times but require different sideline markings as well as different markings within the playing field. Even athletic fields dedicated to one sport need to be re-surveyed and re-marked at intervals. Commonly, a tape measure and a rule book are used for marking such fields. However, this method can be inconvenient and time consuming and the accuracy of the markings will vary from time to time. In order to improve upon this method, many fields have installed permanent pegs or upright markers securely anchored to the ground in surveyed locations that can be used for sighting. However, the large number of markers and pegs for several different game markings can give the field a confused appearance and be hazardous. Furthermore, the uprights and pegs are of limited use for marking team logos or advertisements. The appearance can be improved and the hazard reduced by using removable uprights where only the anchor remains in place, however, this is of no benefit for picture-like patterns.

Staking points are often used in construction, open pit mining, agriculture, paving, and the like. Stakes or paint marks are driven or sprayed into or on the ground at locations that are specified in a site plot or architectural drawing. The user walks between the points to be staked, manually locates the staking points with the aid of a steel tape, laser range finder or GPS survey receiver, and manually marks the location. Successive approximations and a certain amount of hunting is required and the process can be time consuming and prone to error.

There is a need for an automated system for marking or staking of roads, athletic fields, building construction sites, pavement construction sites, mines, agricultural fields, pavement, and the like.

SUMMARY OF THE INVENTION

It is therefore an object of the present invention to provide systems using standard application programs in a computer for generating a data file for a drawing pattern and a global positioning system (GPS) paint sprayer or a GPS guided stakeout apparatus for automatically marking geographical locations accordingly. For a geographical information system (GIS) or architectural application program the systems of the present invention use the global positioning system for marking the geographical locations that are generated in the program. A user uses the program as if he/she is printing on a page. The systems of the present invention convert the drawing pattern to geographical mark locations and then use the global positioning system for automatically marking the geographical locations on a surface.

Briefly, in a preferred embodiment, the system of the present invention includes a standard application program and a paint sprayer driver program of the present invention in a standard computer; and a GPS paint sprayer of the present invention having a GPS receiver and a nozzle. The GPS paint sprayer includes a geographical drawing converter for converting an image of a drawing pattern to geographical mark locations and a location comparator for detecting a location match between the geographical mark locations of the drawing pattern and a current geographical location determined by the GPS receiver. Information for the location match is used for opening and closing the nozzle and controlling its position to correct fine location errors; by an autopilot for providing a steering signal for automatically steering the GPS paint sprayer; and by a display for displaying a location error left or right that can be used by an operator. It should be understood that although the present invention is described as a paint spray system, it could equally well be used as a system for depositing marks with other materials than paint, such as chalk, lime, or the like using a GPS controlled marker for that material.

An advantage of the present invention is that a standard drawing or GIS application program can be used with paint sprayer for automatically marking specified geographical locations on a surface for lines or a picture-like pattern.

In another preferred embodiment, a system of the present invention includes a stakeout driver program and a GPS guided stakeout apparatus. A standard computer is loaded with a standard commercial architectural or other surface site application program and the stakeout driver program. The GPS guided stakeout apparatus includes a vehicle, a robot arm, a stakeout tool, a location comparator, and a controller including a GPS receiver. Either the computer or the GPS guided stakeout apparatus includes programming for a geographical drawing converter for converting an image of a drawing pattern to geographical mark locations. The controller guides the vehicle and articulates the robot arm to position the stakeout tool at the geographical mark locations. The location comparator detects a location match between the geographical mark locations of the drawing pattern and a current geographical location determined by the GPS receiver. Information for the location match is used by the stakeout tool for driving a stake into the ground.

An advantage of the present invention is that a standard drawing or architectural or other surface site application program can be used for automatically staking specified geographical locations.

These and other objects and advantages of the present invention will no doubt become obvious to those of ordinary skill in the art after having read the following detailed description of the preferred embodiments which are illustrated in the various figures.

BRIEF DESCRIPTION OF THE DRAWINGS

FIG. 1 is a block diagram of a GPS paint sprayer system of the present invention including a GPS paint sprayer and an external computer;

FIG. 2 is a block diagram of the external computer of the system of FIG. 1;

DETAILED DESCRIPTION OF THE PREFERRED EMBODIMENTS

Figure 3:
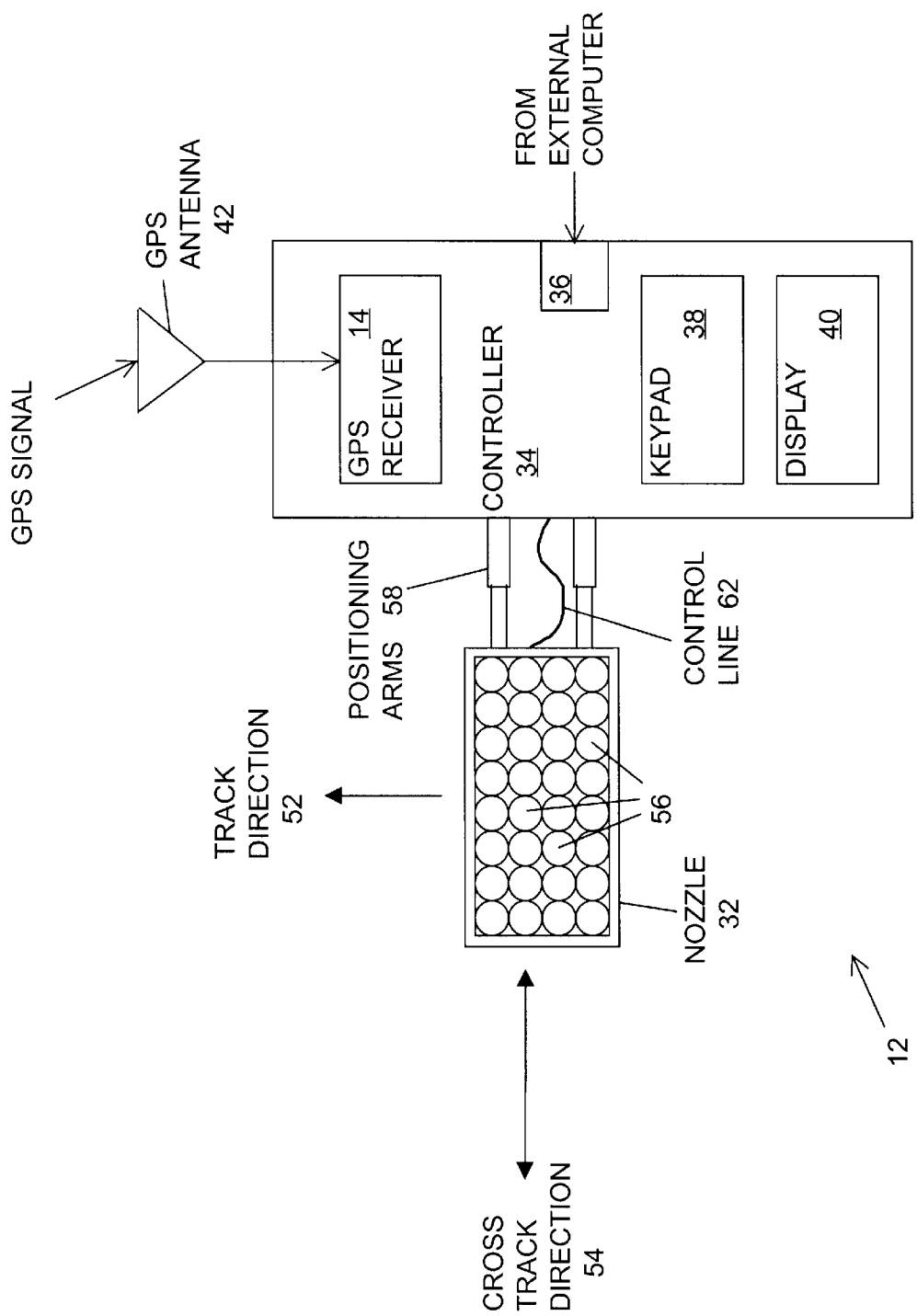
FIG. 3 is a pictorial drawing of the GPS paint sprayer of FIG. 1.

FIG. 1 is a block diagram of a global positioning system (GPS) paint spray system of the present invention referred to by the general reference number 10. The system 10 includes a GPS paint sprayer 12 including a GPS receiver 14 (FIG. 4) and an external computer 16 including an application program 18 (FIG. 2) for generating a paint or other drawing pattern. The external computer 16 provides a print file having data corresponding to the color and intensity of a drawing pattern on a transportable medium such as a floppy disk or through a direct connection to the GPS paint sprayer 12. The GPS paint sprayer 12 or the external computer 16 converts the locations of paint in the drawing pattern to geographical mark locations. The GPS paint sprayer 12 sprays paint when a GPS-based location of the paint sprayer 12 matches one of the geographical mark locations.

FIG. 2 is a block diagram of the external computer 16 including a paint sprayer driver program 22 of the present invention. Preferably, the external computer 16 is a standard personal computer, such as an Apple Macintosh, a Microsoft Windows type PC, a computer using a UNIX operating system, or the like, having a conventional operating system printer service program 24 and loaded with the application program 18 that is available from some other source and the paint sprayer driver program 22 of the present invention. A person identified herein as a designer uses the application program 18 to generate a drawing having pixels that are an image of the desired geographical drawing pattern. The application program 18 may be a commercially available drawing program, such as Corel Draw by Corel Corporation of Ottawa, Canada, AutoCAD by Autodesk, Inc. of San Rafael, Calif., Microsoft Paint by Microsoft Corporation of Redmond, Wash., or the like; or a commercially available Geographical Information Systems program such as InRoads by Intergraph of Corporation of Huntsville, Ala. The paint sprayer driver program 22 converts data for the drawing pattern generated by the application program 18 and processed by the operating system service program 24 into the print file in a form that can be understood by the GPS paint sprayer 12 in a similar manner to a printer driver for a desktop printer of a specific brand or a fax/modem driver for a computer fax/modem.

The operating system service program 24 provides a buffer layer between the application program 18 and the paint sprayer driver program 22 and performs generic image manipulation such as color and/or gray scale mapping using the information returned from the paint sprayer driver program 22. The paint sprayer driver program 22 includes a filter for removing parts of a drawing image such as borders and title blocks. Optionally, the paint sprayer driver program 22 includes a geographical drawing converter 28 that may be used for tying the pixel data in the drawing image to geographical coordinates. For a picture-like drawing pattern such as a logo the designer selects a reference geographical location for the center of the logo, a scale for the size of the logo, and an orientation for the azimuthal lime from the center to the top or other distinguishing aspect of the logo. Alternatively, the designer could specify geographical locations for corners of the logo or scale the logo differently in one dimension than in the other. For a linear drawing pattern such as a road marking, the designer selects geographical locations for end points of a line, or an equation using known geographical location coordinates as independent variables. For example, a drawing pattern for parking lot or a roadway would use the geographical coordinates that are already known from a previous survey. Alternatively, for a curved line the designer selects the end points and a radius. Several line segments may be joined to make a relatively long continuous painted line. Of course, the geographical mark locations can be vertical for marking a wall.

When the designer selects "print", "draw", or the equivalent in the application program 18, the application program 18 passes a data file for the drawing pattern to the operating system service program 24. The operating system service program 24 then calls the paint sprayer driver program 22. The paint sprayer driver program 22 then prompts the designer by causing the external computer 16 to display an initialization dialog menu. The initialization dialog menu enables the designer to make the following selections:

Continuous lines or discrete spots. The continuous line mode would typically be selected for painting lines on a road, airfield, or parking lot. The discrete spot mode would typically be selected for painting a logo or alphanumeric characters. The continuous line mode instructs operating system service program 24 to provide the image of the drawing pattern as vector data. The discrete spot mode instructs the operating system service program 24 for providing the image of the drawing pattern as raster data.

Colors. The colors inform the operating system service program 24 of the colors that are available for color mapping and/or gray scale conversion and are passed to the GPS paint sprayer 12 to instruct a person who is to operate the paint sprayer 12 as to the colors and quantities for each of the colors that must be loaded. Instructions to the paint spray operator for sheen, viscosity, thinning, and/or specific paint by manufacturer and model number can be included.

Dithering on or off. A dithering mode instructs the operating system service program 24 to match colors exactly by applying two paint colors, such as yellow and blue to obtain green.

Geographical conversion fixed, selected, or deferred. A fixed geographical conversion uses geographical coordinates that are pre-determined in the application program 18 such as a road design program providing geographical data from a survey for the road. A selected geographical conversion enables the designer to use the geographical drawing converter 28 in the external computer 16 to select the geographical coordinates of the drawing pattern. Typically, a designer would select the geographical coordinates of the drawing pattern in the external computer 16 for a specific road, parking lot, or architectural plot where GPS-based or the equivalent location information was available to the designer. A deferred geographical conversion defers the selection of the geographical coordinates of the drawing pattern to the GPS paint sprayer 12 on-site. For example, geographical locations for a sports field marking, a logo, or an advertisement that is intended for use in several locations would typically be deferred to on-site selection in the GPS paint sprayer 12 using the GPS receiver 14.

Geographical coordinates. The geographical coordinates for a reference location, a scale, and an orientation for the desired drawing pattern may be fixed, selected, or deferred independently using the geographical drawing converter 28 in the external computer 16. For example, the designer may completely specify the space of the drawing by selecting all three of the reference location, scale, and orientation; or he/she may select the scale and defer the reference location and orientation.

Raster pattern. The driving pattern of a raster scan of the desired drawing pattern may be determined using the geographical drawing converter 28 in the external computer 16. The raster scan lines may include the loopback paths for connecting the ends of the raster lines in the desired geographical drawing pattern.

Draft or High Resolution. The high resolution mode uses data for every pixel for the image created by the application program 18. The draft mode reduces the amount of data that must be processed by not printing all pixels.

Special operator notes. Special instructions to the paint spray operator such as please paint with water soluble lime paint, do not travel faster than 3 mph, or a name and/or phone number to call for problems.

FIG. 3 is a pictorial drawing of the GPS paint sprayer 12 including a nozzle 32 and a controller 34. Preferably, the nozzle 32 is constructed for spraying paint. However, in an alternative, the nozzle 32 may be constructed for depositing chalk, lime, or other marking material. The controller 34 includes a computer data interface 36, a keypad 38, a display 40, and the GPS receiver 14. The GPS receiver 14 connects to a GPS antenna 42. The GPS antenna 42 receives an airwave GPS signal including location-determination information from one or more GPS satellites or GPS pseudolites and passes the GPS signal in a conducted form to the GPS receiver 14. The GPS receiver 14 uses the location-determination information in the GPS signal for determining a GPS-based location for the GPS antenna 42. Data in the form of a print file for the drawing pattern is received from the external computer 16 (FIG. 1) through the computer data interface 36. The paint spray operator enters information to the controller 34 through the keypad 38 and receives information from the display 40.

The GPS paint sprayer 12 has a track direction 52 for a direction of travel for laying down a line of paint such as a highway center line or a raster line in a logo on a field and a cross track direction 54 across the track direction 52. Preferably, the GPS paint sprayer 12 is mounted and carried on a vehicle and the vehicle is steered for traveling in the track direction 52. The nozzle 32 includes individual spray jets several of which are illustrated with a reference number 56. Extensible positioning arms 58 move the nozzle 32 in the cross track direction 54 in order to compensate for fine errors in the location of the nozzle 32 and to select a particular one of the spray jets 56. The display 40 on the controller 34 indicates a left or right cross track error in the location of the nozzle 12 in order to aid the paint spray operator in steering the vehicle. A flexible control line 62 carries a control signal to the nozzle 32. The nozzle 32 uses the control signal for opening a particular one of the spray jets 56 that is indicated. Paint reservoirs (not shown) hold and supply paints to the nozzle 32. For marking a roadway, certain specialized paints having reflective fillings are sometimes used. For marking a sports field chalk or lime may be used in place of paint. Of course, the nozzle 32 and the spray jets 56 would need to be constructed in an appropriate manner depending upon the specific material that was to be used for marking. The vehicle for marking a roadway is typically a motor vehicle. The vehicle for a field is typically a manual push carrier or a golf cart like apparatus.

Figure 4:
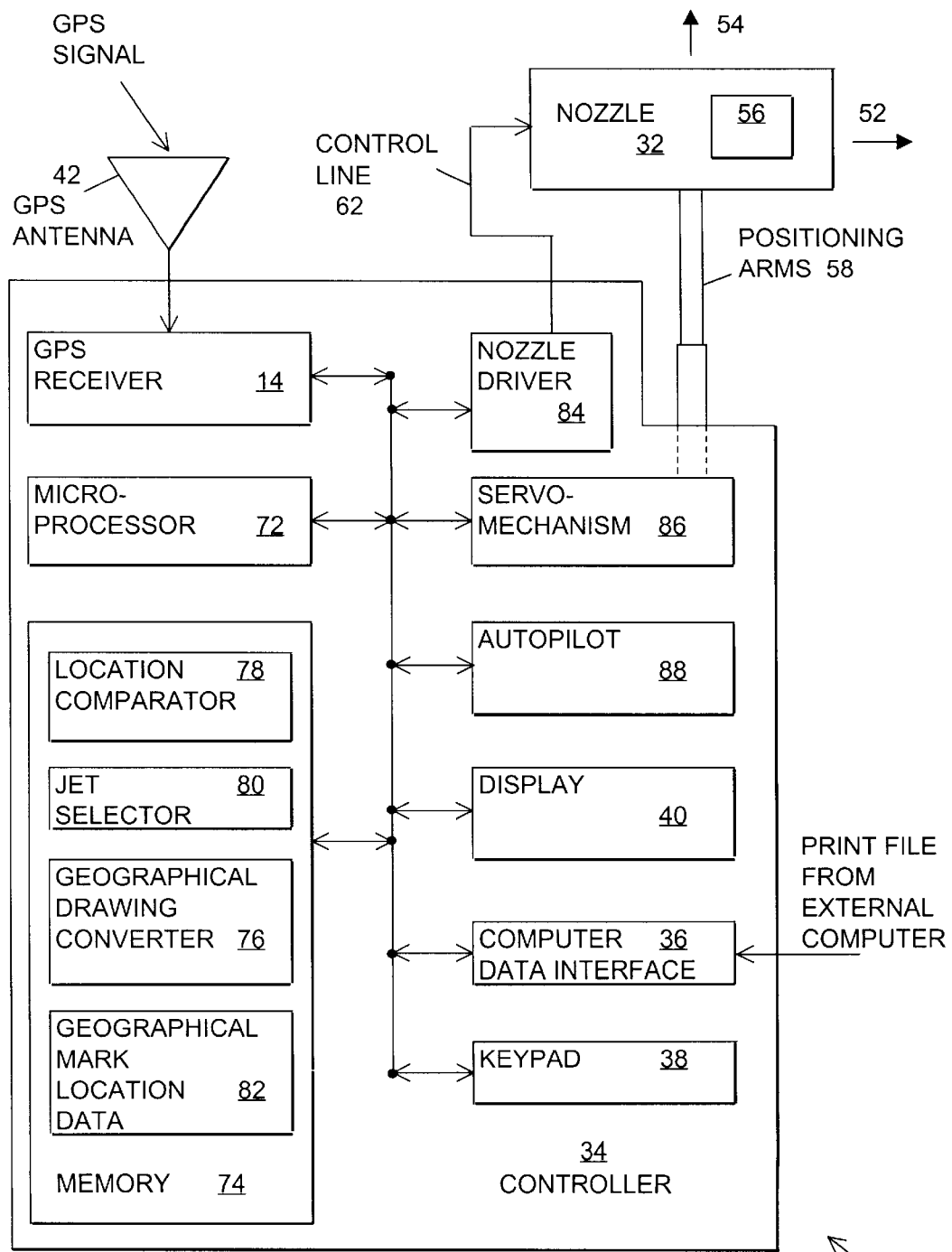
FIG. 4 is a block diagram of the GPS paint sprayer of FIG. 1.

FIG. 4 is a block diagram of the global positioning system (GPS) paint sprayer 12 of the present invention including the GPS receiver 14, the GPS antenna 42, the nozzle 32, the spray jets 56, the positioning arms 58, the control line 62, and the controller 34 described above. The controller 34 includes a microprocessor 72 and a memory 74. The memory 74 includes data and program codes having executable instructions. The microprocessor 72 operates in a conventional manner for executing the instructions in the program codes, reading and writing the data, and issuing and receiving signals to and from the structural elements of the controller 34. The program codes in the memory 74 include codes for an optional geographical drawing converter 76, a location comparator 78, and a jet selector 80.

The geographical drawing converter 76 includes instructions for using geographical location information received from the operator of the paint sprayer 12 through the keypad 38 for converting the print file received from the external computer 16 through the computer data interface 36 to geographical mark locations for the desired drawing pattern having the desired reference location, scale, and orientation for the pattern; and storing the geographical mark locations as geographical mark location data 82 in the memory 74. The location comparator 78 includes instructions for comparing the geographical mark location data 82 and current GPS-based location and detecting when there is a match between the current GPS-based location and one of the data points in the geographical mark location data 82. When a match is detected the location comparator 78 directs the microprocessor 72 for providing the control signal through a nozzle driver 84 over the control line 62 to the nozzle 32.

The jet selector 80 includes data for a color table having data for the position offsets of the respective spray jets 56 in the track direction 52 and the cross track direction 54 as compared to the GPS antenna 42. Preferably, the GPS antenna 42 is fixedly mounted on the controller 34 and the position offsets in the cross track direction 54 include the effect of the current extension of the positioning arms 58. Alternatively, the GPS antenna 42 may be mounted on the nozzle 32, whereby the effect of the current extension of the positioning arms 52 is not required. The operator of the paint sprayer 12 loads the desired colors into the respective spray jets 56 or their reservoirs and then indicates the arrangement of the colors for the respective spray jets 56 through the keypad 38 for storage in the color table. As a part of the process of detecting the location match, the location comparator 78 uses coding in the jet selector 80 for adjusting either the current GPS-based location or the geographical mark location data 82 according to the color table for the position offsets in the track direction 52 and the cross track direction 54.

The location comparator 78 includes instructions for determining a track line in the track direction 52 from one or more adjacent data points in a raster or vector line for the geographical mark location data 82. As the current GPS-based location moves along of the track line, the location comparator 78 determines a distance in the cross track direction 54 between the GPS-based location and the track line; and issues an indicative cross track error signal. The controller 34 includes a servomechanism 86 for receiving the cross track error signal for controlling the positioning arms 58 for correcting for cross track error within the variable range of the arms 58. The display 40 provides the paint spray operator with a right or left indication in response to the cross track error signal for a steering aid. Preferably, the controller 34 includes an autopilot 88 for receiving the cross track error signal and providing a steering signal for automatically steering a vehicle carrying the GPS paint sprayer 12 back onto the track line toward the geographical location for the next data point in the geographical mark location data 82.

Figure 5:
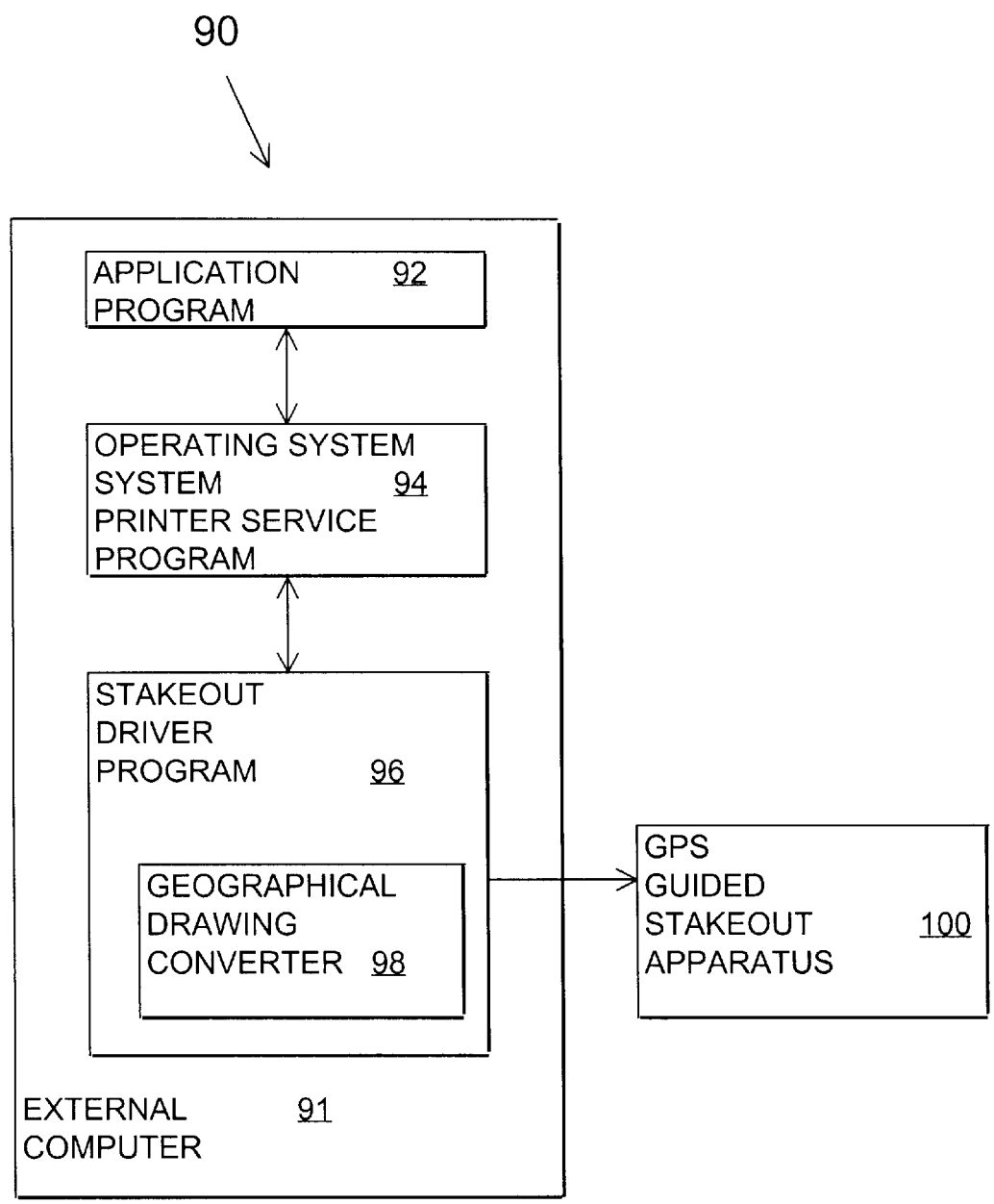
FIG. 5 is a block diagram of a system of the present invention including a GPS guided stakeout apparatus and an external computer.

FIG. 5 is a block diagram of a global positioning system (GPS) stakeout system of the present invention referred to by the general reference number 90. The system 90 includes an external computer 91 and a GPS guided stakeout apparatus 100. Preferably, the external computer 91 is a standard personal computer, such as an Apple Macintosh, a Microsoft Windows type PC, a computer using a UNIX operating system, or the like, having program codes loaded into it including an application program 92, an operating system printer service program 94, and a stakeout driver program 96 optionally including a geographical drawing converter 98. The application program 92 is a commercially available plan drawing program for architecture, mechanical design, or plotting used for identifying points on the surface of a site such as a construction site, a mine, an agricultural field, a paving site, or the like. A person identified herein as a designer uses the application program 92 to generate a drawing image of a stakeout plan having a representation of the desired geographical mark locations of stakes for the site. The designer also selects a reference geographical location for some point at the site and a geographical orientation.

The operating system printer service program 94 provides a buffer layer between the application program 92 and the stakeout driver program 96 and filters the output of the application program 92 for removing parts of the drawing image such as borders and title blocks. The operating system printer service program 94 may also have capability for interactive control by the designer or other user as described above. The stakeout driver program 96 converts data for the stakeout pattern generated by the application program 92 and processed by the operating system printer service program 94 into a print file having a form that can be understood by the GPS guided stakeout apparatus 100 in a similar manner to a printer driver for a desktop printer of a specific brand or a fax/modem driver for a computer fax/modem. The print file having data corresponding to the stakeout plan is placed on a transportable medium such as a floppy disk or connected directly to the GPS guided stakeout apparatus 100. Either the geographical drawing converter 98 or programming for a geographical drawing converter 101 in the GPS guided staking apparatus 100 ties the desired stakeout locations in the drawing image to coordinates for the geographical mark locations. The GPS guided stakeout apparatus 100 marks the spot when a GPS-based location of the GPS guided stakeout apparatus 100 matches one of the geographical mark locations.

Figure 6:
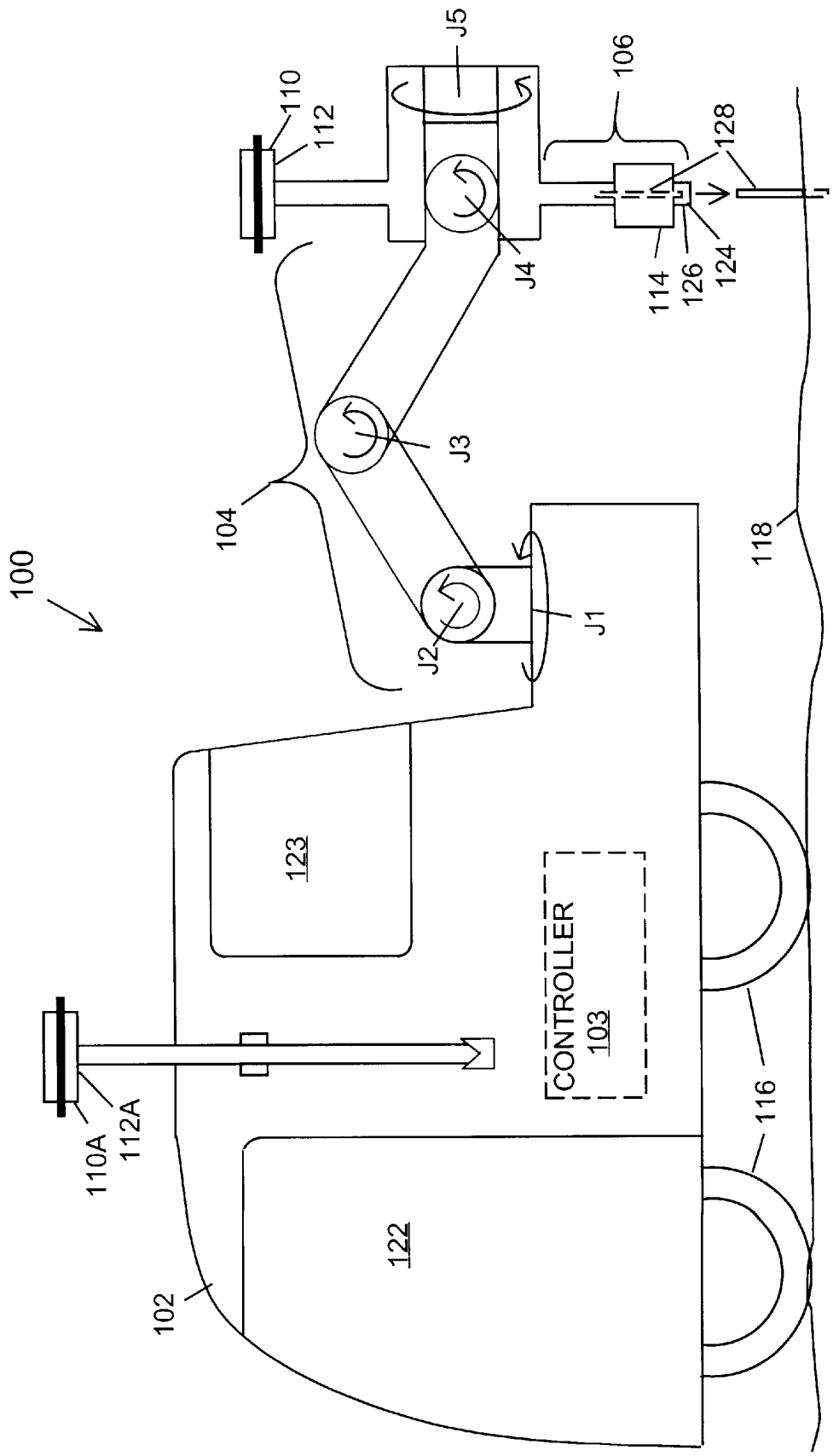
FIG. 6 is a drawing of the GPS guided stakeout apparatus of FIG. 5.

FIG. 6 is a drawing of the GPS guided stakeout apparatus of the present invention referred to by the reference number 100. The stakeout apparatus 100 includes a vehicle 102, a controller 103 carried in the vehicle 102, a robot arm 104 projecting from the vehicle 102, and a stakeout tool 106 at the distal end of the robot arm 104. The vehicle 102 may be similar to a gas or battery powered golf cart. The controller 103 includes a global positioning system (GPS) receiver 108 (FIG. 7) connected to a GPS antenna 110 for guiding the vehicle 102 and articulating the robot arm 104 for positioning the stakeout tool 106 over a geographical location that is to be staked. The vehicle 102 can be manned or unmanned.

The robot arm 104 preferably provides five degrees of mechanical adjustment controlled by the controller 103 for placing the stakeout tool 106 at a specified Cartesian location (x,y,z) with a specified rotation about each of the horizontal Cartesian axes (rx, ry). In a preferred embodiment, the robot arm 104 includes rotating joints J1, J2, J3, J4 and J5; and arms A1, A2, and A3 shown in a schematic form in FIG. 6. Joint J1 rotates about the vertical axis. Arm A1 connects joint J1 to joint J2. Joint J2 rotates about a first horizontal axis. Arm A2 connects joint J2 to joint J3. Joint J3 rotates about the first horizontal axis. Arm A3 connects joint J3 to joint J4. Joint J4 rotates about the first horizontal axis. Joint J4 connects to joint J5. Joint J5 rotates about a second horizontal axis perpendicular to the first horizontal axis. Joint J5 connects to the stakeout tool 106 and the GPS antenna 110.

Together, joints J1, J2 and J3 are controlled for placing the stakeout tool 106 at a given x,y,z location within the limits of the lengths of the arms A1, A2 and A3. In a first (active) variation of a preferred embodiment, joints J4 and J5 are controlled for holding the stakeout tool 106 in a vertical orientation based upon information from a tilt sensor 112 packaged with the GPS antenna 110. In a second (passive) variation of a preferred embodiment, the stakeout tool 106 includes a counterbalance weight 114 positioned directly below the intersection of the axes of joints J4 and J5 so that the stakeout tool 106 hangs in a vertical orientation. It may be required to dampen the motion of joints J4 and J5 in order to prevent the stakeout tool 106 from excessive swinging motion. This can be achieved in joints J4 and J5 with vanes that move through a viscous fluid when the joints J4 and J5 rotate. A electro-rheological fluid can be used in order to vary viscosity with an electrical current so that the joints J4 and J5 might be locked when the apparatus 100 is not being operated.

The vehicle 102 has wheels 116 for driving the vehicle over a ground or other surface 118 and a door 122. The door 122 allows and operator to enter the vehicle 102. When the vehicle 102 is to be manned, a window 123 is included. The surface 118 is a surface of a site such as a construction site, a mine, an agricultural field, a paving site, or the like. The stakeout tool 106 includes a proximity sensor 124 for detecting the distance between the sensor 124 and the surface 118 and either a nozzle for spraying a paint mark on the surface 118 or preferably a stake gun 126 for shooting stakes 128 into the surface 118. The stakeout tool 106 stores several stakes 128 and operates in a similar fashion to a common nail gun.

The controller 103 uses signals from the GPS antenna 110, the tilt sensor 112 and the proximity sensor 124 for properly positioning the stakeout tool 106 over a geographical location that is to be marked by paint or the stake 128. It is intended that the movement of the vehicle 102 provide coarse positioning and the articulation of the robot arm 104 provide fine positioning and compensation for variations in level of the surface 118. Once the stakeout tool 106 is correctly positioned, a trigger for driving the stake 128 can be automatic or under human control.

As an alternative embodiment, a GPS antenna 110A and a tilt sensor 112A mount directly on the vehicle 102. When a vehicle mount is used, the controller 103 must provide open loop offset position information in three dimensions for the articulation of the robot arm 104. The GPS antenna 110, 110A and the tilt sensor 112, 112A may be attached with a quick release mechanism so that they may be used for manual calibration of the site and topographic observations.

Figure 7:
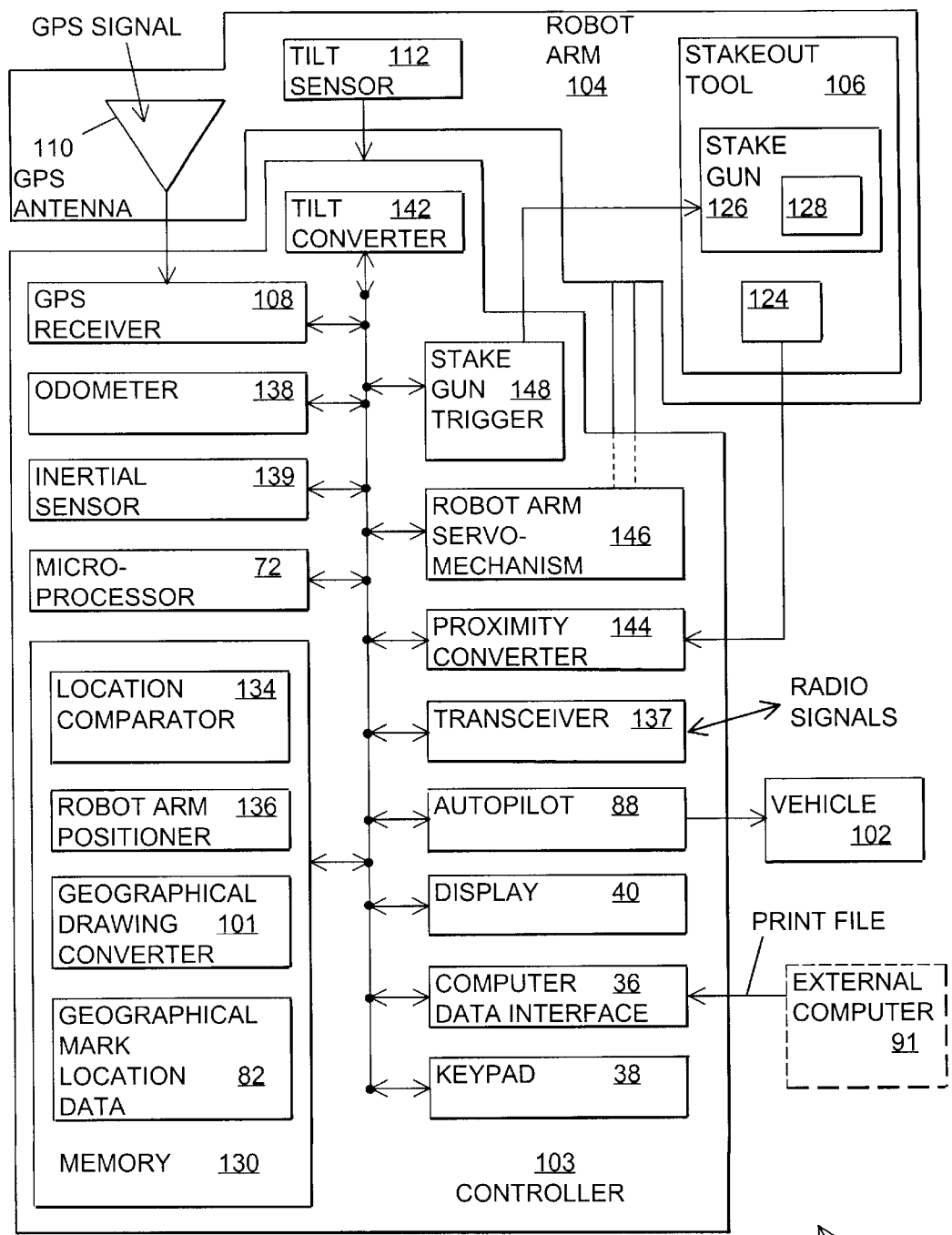
FIG. 7 is a block diagram of the GPS guided stakeout apparatus of FIG. 5.

FIG. 7 is a block diagram showing the external computer 91 and the stakeout apparatus 100. The stakeout apparatus 100 includes the vehicle 102, the controller 103, and the robot arm 104 including the stakeout tool 106, the GPS antenna 110, the tilt sensor 112, the proximity sensor 124, the stake gun 126 and the stakes 128 as described above. The controller 103 includes the computer data interface 36, the keypad 38, the display 40, the microprocessor 72 and the autopilot 88 and the GPS receiver 108 as described above; and a memory 130. The memory 130 includes the geographical mark location data 82 and optionally the geographical drawing converter 98 as described above; and programming for a location comparator 134 and a robot arm positioner 136. Preferably, the GPS receiver 108 and the GPS antenna 110 include real time kinematic (RTK) capability. An RTK GPS reference station is located at or sufficiently near to the site for providing an RTK radio signal having GPS RTK carrier phase observable information. The controller 103 includes a radio transceiver 137 for receiving the RTK radio signal and passing the carrier phase observable information to the GPS receiver 108. The GPS receiver 108 then uses the phase information in a conventional manner for providing GPS-based locations having a high degree of precision. Information from an optional odometer 138 connected to the wheels 116 (FIG. 6) and/or an optional inertial sensor 139 may be integrated with GPS location information for increasing reliability and reducing latency of the GPS-based location of the apparatus 100.

The controller 103 also includes a tilt converter 142, a proximity converter 144, a robot arm servo-mechanism 146, and a stake gun trigger 148. The tilt converter 142 and proximity converter 144 receive signals from the tilt sensor 112 and the proximity sensor 124, respectively, and convert those signals into information in a form that can be processed by the microprocessor 72. The geographical drawing converter 98 includes instructions for using geographical location information received from the operator of the GPS guided stakeout apparatus 100 through the keypad 38 for converting the print file received from the external computer 91 and through the computer data interface 36 to geographical mark locations for the desired drawing pattern having the desired reference location, scale and orientation for the pattern; and for storing the geographical mark locations as geographical mark location data 82 in the memory 130.

The robot arm positioner 136 uses the information from the tilt converter 142 and proximity converter 144 for controlling the robot arm 104 for positioning and orienting the stakeout tool 106 just above the surface 118 (FIG. 6). Although the present invention is described in terms of automatic positioning of the vehicle 102 with the autopilot 88 and automatic articulation of the robot arm 104, the invention could equally well be guided by a human operator locally within the vehicle 102 with the use of the keypad 38 and the display 40 or remotely through the radio transceiver 137.

The orientation of the stakeout tool 106 is usually vertical or normal to the surface 118, however, other orientations may be used. The location comparator 134 includes instructions for detecting when there is a match between the geographical location of the stakeout tool 106 and one of the data points in the geographical mark location data 82. When a match is detected the location comparator 134 generates location match information. In a first embodiment, the location match information automatically directs the microprocessor 72 for providing a control signal through the stake gun trigger 148 to trigger the stake gun 126 to shoot one of the stakes 128 into the ground. In second embodiment, the location match information is issued through the display 40 to an operator. The operator uses the keypad 38 for manually directing the microprocessor 72 for providing the control signal. In a third embodiment the location match information is transmitted to the operator through the radio transceiver 137. The operator then radios back through the radio transceiver 137 for manually directing the microprocessor 72 for providing the control signal.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for staking a site according to a drawing pattern, comprising:

receiving drawing pattern data for said drawing pattern;

determining a global positioning system (GPS)-based location;

determining tilt information;

determining proximity information for proximity to a surface;

using a geographical reference location for converting said drawing pattern data to geographical stake locations;

detecting a location match when said GPS based location matches one of said geographical stake locations;

automatically articulating a robot arm according to said GPS based location, said tilt information, and said proximity information for disposing said stakeout tool proximate to said geographical stake location; and staking said surface at said site with said stakeout tool when said location match is detected.

2. A method for staking a site according to a drawing pattern, comprising:

determining a global positioning system (GPS)-based location;

receiving drawing pattern data for said drawing pattern;

using a geographical reference location for converting said drawing pattern data to geographical stake locations;

detecting a location match when said GPS based location matches one of said geographical stake locations; and automatically staking a surface when said location match is detected.

3. A global positioning system (GPS) guided stakeout apparatus, comprising:

a stakeout tool for staking a surface when commanded by a control signal;

a data interface for receiving drawing pattern data;

a GPS receiver for providing GPS based location information for determining a GPS based location;

a geographical drawing converter for using a geographical reference location for converting said drawing pattern data to geographical mark locations;

a vehicle for carrying the stakeout tool;

an autopilot coupled to the GPS receiver for using said GPS based location information for guiding the vehicle toward one of said geographical mark locations; and a location comparator for generating location match information when said GPS based location matches said geographical mark location, said location match information used for providing said control signal.

4. A global positioning system (GPS) guided stakeout apparatus, comprising:

a stakeout tool for staking a surface when commanded by a control signal;

a data interface for receiving drawing pattern data;

a GPS receiver for providing GPS based location information for determining a GPS based location;

a geographical drawing converter for using a geographical reference location for converting said drawing pattern data to geographical mark locations;

a tilt sensor for providing information for a tilt of the stakeout tool;

a proximity sensor for providing information for proximity of the stakeout tool to said surface;

a robot arm including a servo-mechanism for articulating the robot arm according to said GPS based location information, said tilt information, and said proximity information for disposing the stakeout tool proximate to one of said geographical mark locations; and a location comparator for generating location match information when said GPS based location matches said geographical mark location, said location match information used for providing said control signal.

5. A global positioning system (GPS) guided stakeout apparatus, comprising:

a stakeout tool for staking a surface;

a data interface for receiving drawing pattern data;

a GPS receiver for providing GPS based location information for determining a GPS based location;

a geographical drawing converter for using a geographical reference location for converting said drawing pattern data to geographical mark locations;

a location comparator for generating location match information when said GPS based location matches one of said geographical mark location, said location match information for automatically triggering the stakeout tool for staking said surface when said location match is detected.

* * * * *